April 12, 1966  E. R. COOPER, JR., ETAL  3,245,657

TURBINE ROTOR

Filed Sept. 10, 1963

INVENTORS
Eugene R. Cooper, Jr. &
BY William F. Jones

Paul Fitzpatrick
ATTORNEY

3,245,657
TURBINE ROTOR
Eugene R. Cooper, Jr., North Salem, and William F. Jones, Indianapolis, Ind., assignors to General Motors Corporation, Detroit, Mich., a corporation of Delaware
Filed Sept. 10, 1963, Ser. No. 307,831
2 Claims. (Cl. 253—39)

Our invention relates to turbine rotors, and particularly to a seal fitted between the rims of adjacent wheels or wheel-like members of a turbine rotor to seal the cavity between the wheels and prevent loss of air used for cooling the rotor. The invention is particularly advantageous because of its simple structure, self aligning nature accommodating relative expansion of the parts, and light weight minimizing the centrifugal loads added to the rotor wheels by the seal.

The nature of the invention and its advantages will be clear to those skilled in the art from the succeeding detailed description of the preferred embodiment and the accompanying drawings thereof.

Figures 1, 2, 3:
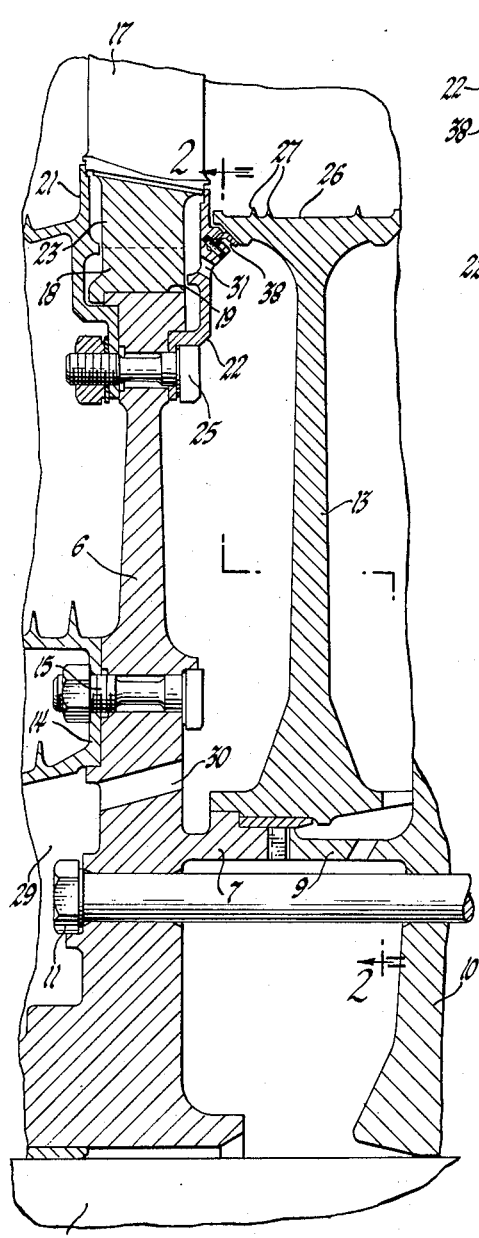
FIGURE 1 is a partial sectional view of a multistage turbine rotor incorporating the invention, the section being taken on a plane containing the axis of the rotor.
FIGURE 2 is a partial transverse sectional view taken on the broken plane indicated by the line 2—2 in FIGURE 1.
FIGURE 3 is a considerably enlarged view of a portion of FIGURE 1.

The drawings illustrate the invention in its preferred embodiment in a multistage axial-flow turbine. The turbine, which is shown sufficiently to illustrate the invention, comprises a shaft 5 which is integral with a first-stage turbine wheel 6. The wheel 6 has a flange 7 splined to cooperate with mating splines on a flange 9 extending from a second turbine wheel 10, shown only fragmentarily. The wheels are held together by a ring of bolts 11. A sealing ring or spacer disk 13, which also may be regarded as a wheel of the turbine, is mounted between the blade wheels 6 and 10. Wheel 13 is piloted on the flange 7. A seal ring 14 to cooperate with the fixed structure of the turbine is mounted on the forward face of wheel 6 by a ring of bolts 15. The turbine wheel 6 bears a ring of blades 17 which have stalked roots 18 mounted in transverse slots 19 in the rim of the wheel. The blades are held in place between a forward blade stalk sealing ring 21 and a rear blade stalk sealing ring 22. Rings 21 and 22 prevent by-passing of the blades by motive fluid and keep the hot motive fluid away from the blade stalks 23. The rings 21 and 22 are radially located by shoulders or flanges on the rim of the wheel, and are held in place by bolts 25.

The sealing wheel or spacer disk 13 has a wide rim 26 bearing ridges 27 to cooperate with the inner shroud of a second-stage turbine nozzle (not illustrated). Air to cool the turbine blades is introduced from a suitable source (not illustrated) into the chamber 29 between the shaft 5 and seal ring 14. It flows through holes 30 in wheel 6, and through holes 31 in ring 22 into the annulus between that ring and the blade roots. From there, it flows between the blade stalks and is discharged through the blades, which are hollow according to known practice. It is most undesirable to have the cooling air leak through the small gap between the wheels 6 and 13, and it is not feasible to eliminate the gap because of the thermal expansion of the turbine parts, which have a very wide range of temperatures.

Our invention provides a suitable trouble-free, lightweight seal of very simple structure. As shown most clearly in FIGURE 3, the stalk sealing ring 22 has a slot 33 cut in its rear face, which slot is approximately at a 45° angle to the axis of rotation. The flange 26 of wheel 13 has an inner conical surface 35, also approximately at a 45° angle. It will be seen that these surfaces closely approach each other, but that a narrow gap 37 is left between the two wheels. A lightweight relatively flexible sealing ring 38, which is of L-shaped cross section and has two outer faces, each substantially at 45° to the axis, is mounted in the slot 33 so as to bear against its outer surface and to bear against the surface 35 of the sealing wheel 13. The ring 38 is split at 39 (FIG. 2) to facilitate installation and expansion, although this is not absolutely essential. Preferably, to prevent rotation of the sealing ring relative to the wheels, a pin 41 is inserted in hole 42 of ring 22 so as to cooperate with a notch 43 in the sealing ring. The pin 41 may be retained by peening the material around the end of hole 42, or by friction.

As will be apparent, if the rims or rings 22 and 26 move together or apart axially, or expand either equally or unequally in the radial direction, the sealing ring 38 can shift axially or expand or contact radially to maintain a sealing fit against them. The approximately 45° angle facilitates this shifting and eliminates any tendency to wedge or freeze in place.

It is to be understood that the ring is as light as feasible so that it is not held in place by its own resilience, which is insignificant, but rather by centrifugal force due to rotation of the turbine. It is well known that turbines generally rotate at speeds calculated to produce high centrifugal forces at the rims of the wheels. Preferably, the ring 38 is of a heat and corrosion resistant nickel base alloy if used in a turbine. The ring is of rolled strip stock, preferably two or three hundredths of an inch thick. It is desirable that the ring have a thermal expansion coefficient close to that of the wheels with which it coacts so as to minimize variation of the gap in the ring.

It is quite clear that the type of seal indicated could be put between any two wheels or disks of a turbine rotor, whether they are blade wheels or sealing wheels.

The detailed description of the preferred embodiment of the invention is not to be considered to limit or restrict the invention, since many modifications may be made within the scope of the invention.

We claim:
1. A turbine rotor comprising, in combination, first and second coaxial mutually adjacent wheels, means on the wheels defining mutually adjacent flanges having internal surfaces coned at about a 45° angle to the axis of the wheels, the two said surfaces confronting each other and defining a groove open toward the axis of the wheels, the flanges being slightly spaced, a flexible lightwenght split sealing ring or L-shaped cross section loosely fitting in said groove, the ring having two flexible conical web portions each adapted to fit against one of said surfaces so that the ring is seated in the groove defined by the flanges and urged against both said flanges by centrifugal force in operation of the rotor so as to conform to said surfaces and seal the gap resulting from the spacing of the flanges, and interengaging parts on said ring and on one of said wheels holding the ring against rotation relative to the said wheel about the axis of the wheels.

2. A rotor as recited in claim 1 in which one wheel is a bladed wheel including a blade stalk sealing ring, and the said surface thereof is in the blade stalk sealing ring.

References Cited by the Examiner

UNITED STATES PATENTS

| | | |
|---|---|---|
| 2,356,605 | 8/1944 | Meininghaus _____ 253—39 |
| 2,382,706 | 8/1945 | Gente. |
| 2,557,747 | 6/1951 | Judson et al. |
| 2,773,667 | 12/1956 | Wheatley _____ 253—77 X |
| 2,807,434 | 9/1957 | Zimmerman. |

FOREIGN PATENTS

| | | |
|---|---|---|
| 903,933 | 2/1954 | Germany. |

SAMUEL LEVINE, Primary Examiner.

JULIUS E. WEST, Examiner.